United States Patent [19]

Korobchenko et al.

[11] Patent Number: 4,634,869
[45] Date of Patent: Jan. 6, 1987

[54] LIQUID SCINTILLATION COUNTER

[75] Inventors: Leonid G. Korobchenko; Sergei I. Prokofiev, both of Moscow, U.S.S.R.

[73] Assignee: Institut Molekulyarnoi Genetiki Akademii Nauk SSSR, Moscow, U.S.S.R.

[21] Appl. No.: 518,138

[22] Filed: Jul. 28, 1983

[30] Foreign Application Priority Data

Aug. 11, 1982 [SU] U.S.S.R. .................... 3494123
Nov. 19, 1982 [SU] U.S.S.R. .................... 3514721

[51] Int. Cl.$^4$ .................... G01T 7/08; G01T 1/204
[52] U.S. Cl. .................... 250/328; 250/364
[58] Field of Search .................... 250/328, 364

[56] References Cited

U.S. PATENT DOCUMENTS

| | | | |
|---|---|---|---|
| 2,843,753 | 7/1958 | Meeder | 250/328 |
| 3,270,202 | 8/1966 | Long et al. | 250/328 |
| 3,626,190 | 12/1971 | Cannon | 250/328 |
| 3,852,599 | 12/1974 | Smith | 250/328 |

Primary Examiner—Carolyn E. Fields
Attorney, Agent, or Firm—Ladas & Parry

[57] ABSTRACT

A liquid scintillation counter comprises a detector with a measuring chamber disposed on a horizontal plate having two holes and a device for delivering a test specimen to the measuring chamber, which is arranged under the plate and has a screw pair with a lead screw and a nut, guides with vertical slots to ensure progressive upward and downward movement of the nut and a shutter installed below at the outlet of the vertical slot. The nut mounts a receiving assembly secured so that it is found precisely within any hole in the plate after the nut is turned and lifted. Said nut has at least one roller secured on its butt end and interacting with the vertical slot, said roller cooperating with the shutter at the outlet of said vertical slot.

10 Claims, 9 Drawing Figures

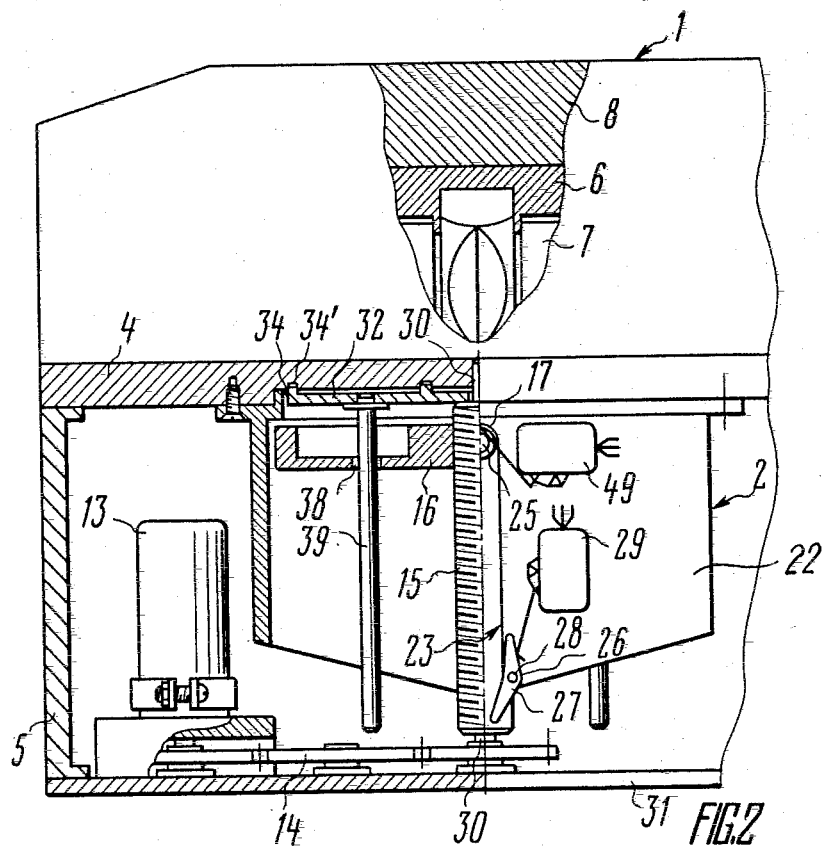

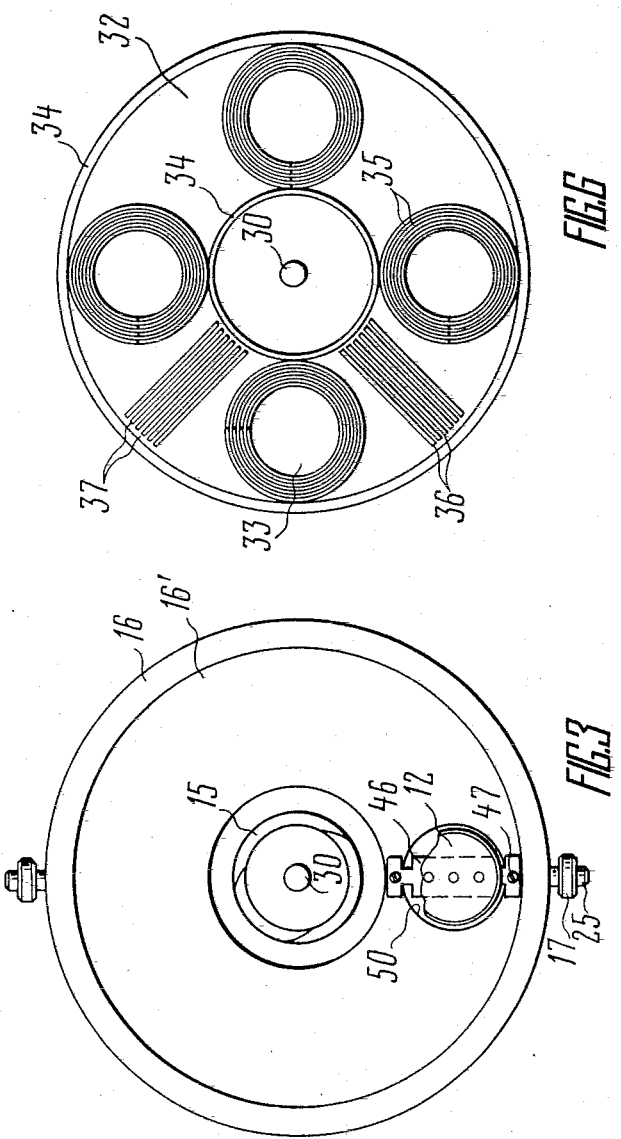

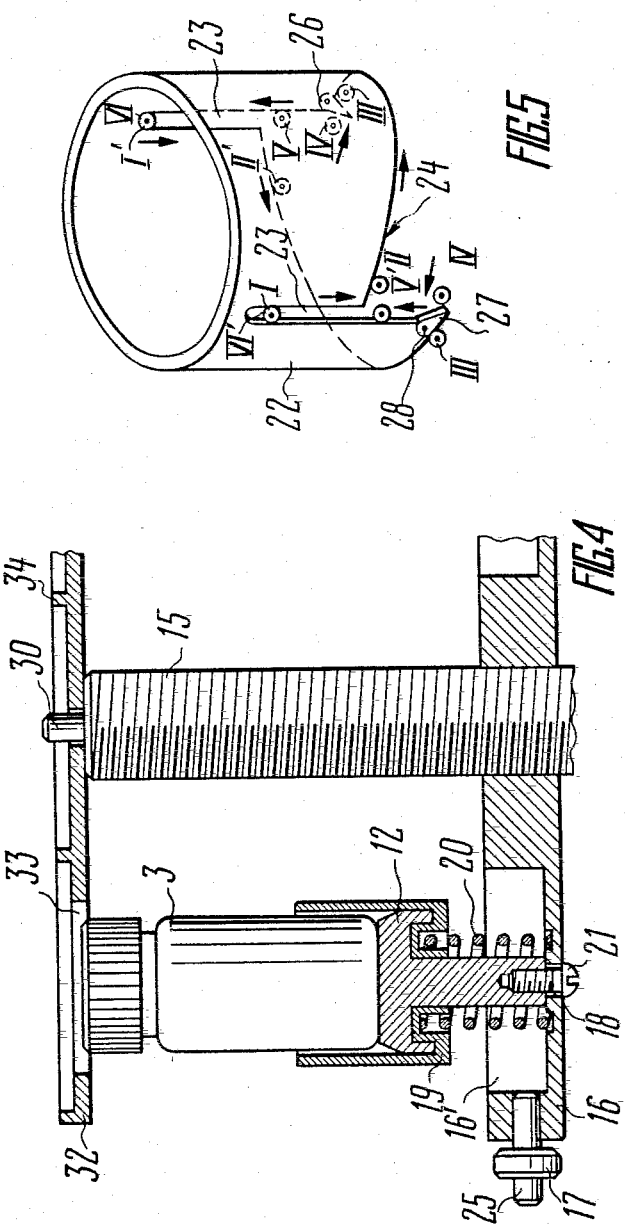

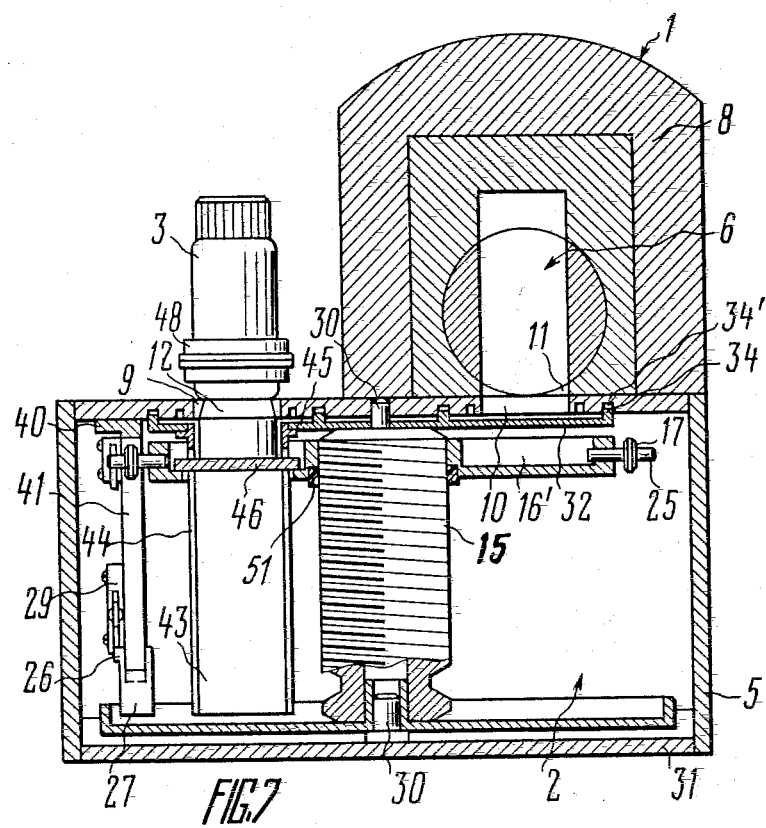

LIQUID SCINTILLATION COUNTER

FIELD OF THE INVENTION

The present invention relates to facilities for determining radionuclide content in various substances and in particular to liquid scintillation counters.

The invention may be used for determining radionuclide content in hydrogen, carbon, iodine, iron, phosphorus and like substances which, when decayed, emit beta, gamma and alpha rays. It may be widely used in physicochemical biology, biotechnology, experimental medicine, geology, hydrogeology, agriculture, environmental studies and also in other fields wherein quantitative measurements are made of the content of the aforementioned elements, particularly of hydrogen and carbon-containing substances.

BACKGROUND ART

The invention uses a scintillation method of converting energy of radiating particles into a luminous flux which is subsequently converted into an electrical signal by photomultiplier tubes. A test substances is mixed with a scintillation solution whereby a "cocktail" is formed.

The aforesaid method involves refined recording techniques which are highly sensitive, a factor having particular importance in finding softly radiating low-intensity isotopes.

There is known a liquid scintillation counter comprising a detector with a measuring chamber and photomultiplier tubes which is surrounded by a protective shell and having a hole in the bottom portion of the measuring chamber. The known counter also includes a device for delivering a test specimen placed in a receiving assembly, said device being coupled to an electric motor, a vertical light shutter coupled to another electric motor, and a plate having a hole and suited to accommodate a plurality of test specimens and deliver them to the detector (cf. U.S. Pat. No. 3,270,202). The foregoing liquid scintillation counter is characterized by that the detector with the measuring chamber and photomultiplier tubes is disposed above the plate and the receiving assembly, the device for delivering test specimens is arranged below the plate, and the receiving assembly is found in the hole in said plate and made to enable upward movement of test specimens into the measuring chamber of the detector and back. The vertical light shutter is made as a hollow cylinder capable of moving in a vertical direction and encompassing the receiving assembly. The receiving assembly comprises a cylindrical head tapered in its upper portion which is secured at the top on the cylinder of the telescopic assembly of the device for delivering a test specimen.

The receiving assembly is initially found in the lower position at the plate level and receives a test specimen from a corresponding section of a conveyer, while the vertical shutter is found in the upper position inside the measuring chamber of the detector. In operation the vertical light shutter moves down. After it stops in a new position, the receiving assembly containing the test specimen moves up into the measuring chamber. The test specimen is returned from the measuring chamber in reverse order.

The counter under review has been generally unsatisfactory due to its considerable height conditioned firstly by position of the detector above the plate at a level higher than the flask containing the specimen and secondly by the height of the device for delivering a test specimen to the measuring chamber, which is located below the plate. Said plate isolates the device for delivering a test specimen from the measuring chamber of the detector, a limitation preventing effective protection of the measuring chamber against light.

Another disadvantage of the counter under review is that the device for delivering a test specimen and the light shutter are actuated by two motors, the sequence of their operations being controlled by an automatic control circuit in accordance with a predetermined program, a feature substantially complicating the entire device and decreasing its operational reliability. Moreover, said position of the detector prevents installation of a test specimen directly on the receiving assembly, a limitation making measurements of single specimens inconvenient.

The prototype of the present invention is a liquid scintillation counter (cf. U.S. Pat. No. 3,852,599, Cl. 250-328) comprising a detector with a measuring chamber and photomultiplier tubes, which is surrounded by a protective shell and has a hole in a bottom portion thereof, a plate having two holes and suited to accommodate a plurality of specimens, and a tube connecting one of the holes in the plate with a hole in the measuring chamber of the detector. The aforesaid counter also includes three delivery means with pneumatic actuators and receiving assemblies for transferring a test specimen from the surface of the plate through the hole therein into the measuring chamber of the detector which is installed above the plate and connected with one of its holes via a tube forming a light-proof channel.

The afore-mentioned counter is characterized by that the process of delivering a test specimen from the surface of the plate out of a respective section of the conveyor to the measuring chamber of the detector and back consists of three stages, each of which involves the use of different delivery means with associated receiving assemblies and pneumatic actuators, relative movement of each delivery means being controlled by a device enabling automatic control of movement of a test specimen through limit switches.

The receiving assembly of the first means initially receives a test specimen from a respective section of the conveyer, said first means being set to the upper position. The second means displacing a test specimen in a horizontal direction is prepared to receive the test specimen from the first means into its receiving assembly. The third means placed in the lower position is ready to receive the test specimen into its receiving assembly. In operation, the first receiving assembly moves the test specimen downwards to a position at which it enters the receiving assembly of the second means which moves the test specimen in a horizontal plane until it is placed in the receiving assembly of the third means. Said third means moves up vertically the test specimen through a respective channel into the measuring chamber of the detector. The test specimen is returned to the plate in the respective conveyer section in reverse order.

The receiving assemblies of vertical transmitters include cylindrical tables secured in the upper portion of rods which are linked with the pneumatic actuators.

The receiving assembly of the device accomplishing horizontal displacement comprises a piston having holes, a bottom portion thereof being provided with a circular lug adapted to accommodate a test specimen on completion of the first delivery stage. The piston coupled to the pneumatic actuator is installed in the hollow horizontal cylinder in a manner allowing its displacement inside said cylinder which has four holes adapted to pass a test specimen in a vertical direction. Also, the piston compised in said counter acts as a light shutter to protect the measuring chamber of the detector against light. For this purpose, its cylindrical portion accommodates two annular seals.

The known counter has been generally unsatisfactory due to its considerable height conditioned by the fact that the detector is arranged above the plate adapted to accommodate a plurality of test specimens at a level exceeding that of the flask containing a test specimen, the device accomplishing horizontal movement of a test specimen is located below said plate and the devices enabling vertical displacement thereof are disposed below the device accomplishing said horizontal movement and representing air cylinders whose height depends on the height to which the receiving assemblies are lifted.

Another disadvantage of the known counter is that the device enabling horizontal transfer of said flask has a considerable structural length determined by a horizontal stroke and dimensions of the pneumatic actuator, a factor substantially increasing its volume.

Also, as the movement of a test specimen from the plate out of a respective conveyer section to the measuring chamber of the detector involves three stages in transferring the flask containing a test specimen from one receiving assembly to another and therefrom to the third receiving assembly, each receiving assembly being provided with an individual transfer means with a pneumatic actuator, there arises the need for controlling the sequence of their operations by the use of an automatic control circuit in accordance with a predetermined program, a disadvantage complicating the entire device and decreasing operational reliability thereof.

BRIEF DESCRIPTION OF THE INVENTION

It is an object of the invention to create a liquid scintillation counter which would have a lesser height than prior art counters.

Another object of the invention is to reduce the total volume of a counter.

Still another object of the invention is to produce a portable counter.

A further object of the invention is to provide a counter having the same or better sensitivity as compared to the prior art.

One more object of the invention is to provide a compact, highly efficient system composed of a set of liquid scintillation counters.

There is provided a liquid scintillation counter comprising a detector with photomultiplier tubes, a measuring chamber thereof having in its bottom portion a hole adapted to receive a test specimen, said detector being surrounded by a protective shell, a device for delivering a test specimen to the measuring chamber, said test specimen being placed in a receiving assembly, and a horizontal plate having two holes, one of which accommodates the receiving assembly for mounting the test specimen, while the detector is arranged above the other hole so that the hole in the bottom portion of the measuring chamber is aligned with the respective hole in the plate, the device for delivering the test specimen to the measuring chamber being mounted below the plate in a manner allowing movement of the test specimen downwards, then towards the detector and up into the measuring chamber, as well as backward movement thereof in reverse order, in which, according to the invention, the device for delivering the test specimen has a screw pair with a lead screw and a nut, guides having at least one vertical slot to ensure progressive upward and downward movement of the nut, and a shutter arranged below at the outlet of the vertical slot, the lead screw being installed vertically and symmetrically with respect to geometrical axes of the holes in the plates coupled to an electric motor, while the nut mounts the receiving assembly for mounting the test specimen so that it is precisely within any hole in the plate after the nut is turned and lifted, said nut having at least one roller secured on its butt end and cooperating with the respective vertical slot and interacting with the shutter at its outlet.

It is of advantage that the measuring chamber should be installed directly on the plate so that the hole in its bottom portion is a continuation of the respective hole in said plate.

The guides may be made as a hollow cylinder arranged coaxially with the lead screw, the screw pair being arranged inside the hollow cylinder. Also, the guides may be made as a vertical plate.

Preferably the counter has a light shutter to preclude penetration of light into the measuring chamber of the detector which is arranged below the plate and above the device for delivering a test specimen. It is also of advantage that, in compliance with the invention, the detector should represent a rotary disk whose rotation axis is coaxial with the lead screw, said disk having a hole disposed so that the geometrical axis of the receiving assembly is a continuation of the hole axis. Depending on the position of the disk, said hole is also coaxial with the respective hole in the plate.

Furthermore, with a view to making disk rotation synchronous with the nut, it is also preferable that said nut should have a hole in which a rod is freely mounted. Said rod is secured to the disk and has a length comparable with the vertical stroke of the nut.

Desirably the receiving assembly for mounting a test specimen includes a microscopic stage and a spring-loaded bush encompassing said stage and movable relative thereto.

However, the receiving assembly for mounting a test specimen may comprise a hollow cylinder with vertical slots, said cylinder being fixed in the hole in the rotary disk and freely passing through the hole in the nut, while the microscopic stage may be secured to the nut and moved in the vertical slots inside the hollow cylinder when the nut moves.

It is also desirable that lugs should be made on the surface of the rotary disk and bores should be found on the surface of the plate facing the rotary disk, a light-proof labyrinth being formed by said bores in conjunction with the lugs of the rotary disk.

This permits creating a liquid scintillation counter having a substantially smaller height and volume as compared with the prior art. A decreased height and volume allow appreciably reducing the weight of the entire instrument and providing a small-size portable or desk-type counter having the same or better sensitivity as compared with the known stationary instruments serving the same purpose.

Moreover, the above features make it possible to substantially simplify a device for delivering a test specimen in the proposed liquid scintillation counter.

BRIEF DESCRIPTION OF DRAWINGS

The foregoing and other advantages of the present invention will become apparent from the discussion of specific embodiments thereof, taken in conjunction with the accompanying drawings, wherein:

FIG. 2 is a longitudinal section showing a front view of the counter according to the invention;

FIG. 3 is a top view of a sliding nut along arrow A according to the invention;

FIG. 4 is an enlarged sectional view of a receiving assembly according to the invention;

FIG. 5 is a general perspective view of a guide made as a hollow cylinder according to the invention;

FIG. 6 is a top view of a light shutter made as a disk according to the invention;

FIG. 7 is a longitudinal section showing a side view of another embodiment of the liquid scintillation counter according to the invention;

DETAILED DESCRIPTION OF THE INVENTION

Figure 1:
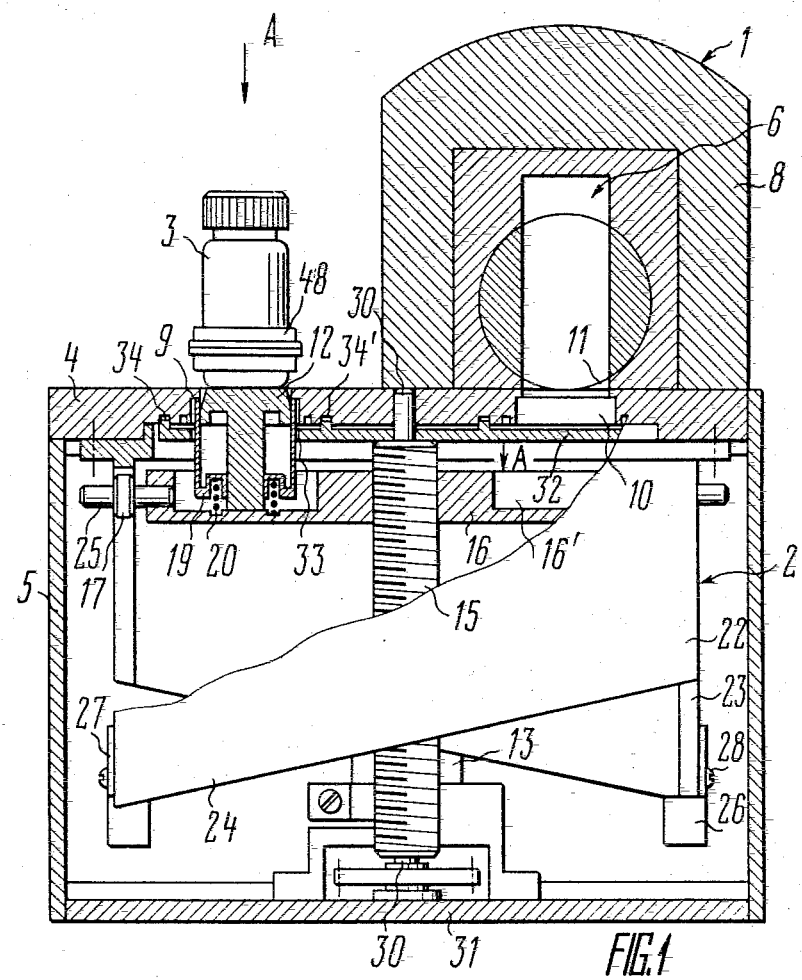
FIG. 1 is a longitudinal section illustrating a side view of a liquid scintillation counter according to the invention.

Referring to the drawings the liquid scintillation counter forming the subject of the invention comprises a detector 1 (FIGS. 1, 2) and a device 2 for delivering a test specimen 3 to the detector 1, which are arranged on a horizontal plate 4 secured within an enclosure 5.

The detector 1 comprises a measuring chamber 6 with a light guide and photomultiplier tubes 7 and is surrouned by a protective shell 8.

The detector 1 is arranged on the horizontal plate 4 which also mounts the test specimens 3 (one or a plurality of the test specimens). The device 2 is, in turn, arranged below the plate 4 and made so that it enables the test specimen 3 to move downwards, then towards the detector 1 and up into the measuring chamber 6. The test specimen 3 may be moved downwards by a distance slightly exceeding the height of the vessel containing the test specimen. This distance determines, to a large measure, the height of the entire device 2 and of the counter as a whole, a feature enabling creation of a portable or a stationary counter.

The plate 4 has two holes 9 and 10, one of said holes (9) accommodating the receiving assembly of the device 2, while the detector 1 is disposed above the other hole (10). The hole 10 should be coaxial with the hole 11 in the bottom portion of the measuring chamber 6 which is arranged directly on the plate 4 so that the hole 11 is a continuation of the hole 10.

The device 2 includes said receiving assembly having a microscopic stage 12 mounting the test specimen 3, an electric motor 13 and a screw pair coupled thereto through a kinematic chain member 14. A lead screw 15 of the screw pair is placed vertically and symmetrically with respect to geometrical axes of the holes 9 and 10. A nut 16 of the screw pair interacts with the lead screw 15, its butt end mounting two diametrically opposite rollers 17 (FIG. 3), said rollers 17 being arranged in line with a hole 18 in the nut.

The nut 16 mounts the receiving assembly so that the rollers 17 (FIGS. 1, 4) are arranged in line therewith. The receiving assembly of the microscopic stage 12 has a bush 19 loaded by a spring 20 and encompassing the microscopic stage 12. The bush 19 is arranged in a recess 16' of the nut 16, a factor decreasing the total height of the counter. The microscopic stage 12 is held in place by a screw 21, and the spring 20 is positioned between the surface of the nut 16 and the lower surface of the bush 19.

The device 2 has guides to ensure progressive upward and downward movement of the nut 16. The guides of FIGS. 1, 2 and 5 are made as a hollow cylinder 22 having two vertical slots 23.

The slots 23 (FIG. 5) having an outlet in the lower portion of the cylinder 22 smoothly change into oblique tapered sections 24 on the side surface of the cylinder 22.

The hollow cylinder 22 is installed coaxially with the lead screw 15 (FIG. 1) encompassing the screw pair and is secured below on the plate 4 so that the slots 23 are in horizontal alignment with the holes 9 and 10 in the plate 4. The respective roller 17 arranged on the butt end of the nut 16 on a shaft 25 moves within each slot 23.

Secured on the cylinder 22 below at the outlet of each slot 23 is a shutter 26 representing a two-arm lever 27 (FIGS. 2, 5) turning on a shaft 28. One arm of the lever 27 cooperates with the rollers 17, while the other arm thereof interacts with a limit switch 29 (FIG. 1).

The lead screw 15 is mounted on a shaft 30 in the plate 4 and in a base 31 of the enclosure 5 of the counter.

To protect the measuring chamber 6 of the detector 1 against light, the counter comprises a light shutter arranged below the plate 4 but above the device 2. Said light shutter is made as a rotary disk 32 (FIGS. 1, 2, 4) mounted on the shaft 30 of the lead screw 15. The disk 32 having one hole 33 is installed so that its hole 33 is aligned with the holes 9 and 10 in the plate 4 depending on the position of the disk 32. Moreover, the hole 33 is made in an appropriate section of the disk 32 so that when it is installed in the counter the axis of the hole 33 is a continuation of the geometrical axis of the receiving assembly. The surface of the disk 32 is provided with annular lugs 34 (FIG. 6) arranged in respective annular bores 34' of the plate 4 to form a lightproof labyrinth. Also, the surface of the disk 32 facing the lower surface of the plate 4 is provided with annular or other suitable grooves 35 or lugs 36, 37 to form another lightproof labyrinth.

In order that the disk 32 rotates in synchronism with the nut 16, said nut has a hole 38 (FIG. 2) wherein a rod 39 is freely mounted. The rod 39 secured to the disk 32 has a length comparable with the vertical stroke of the nut 16.

The guides may also be made as vertical plates 40, as shown in FIG. 7 illustrating another preferred embodiment of the invention. The plate 40 has a slot 41 (FIGS. 7, 8) wherein any of the rollers 17 is moved. The plate 40 has a tapered portion 42 with the shutter 26 arranged nearby as in the first embodiment of the invention.

Figure 8:
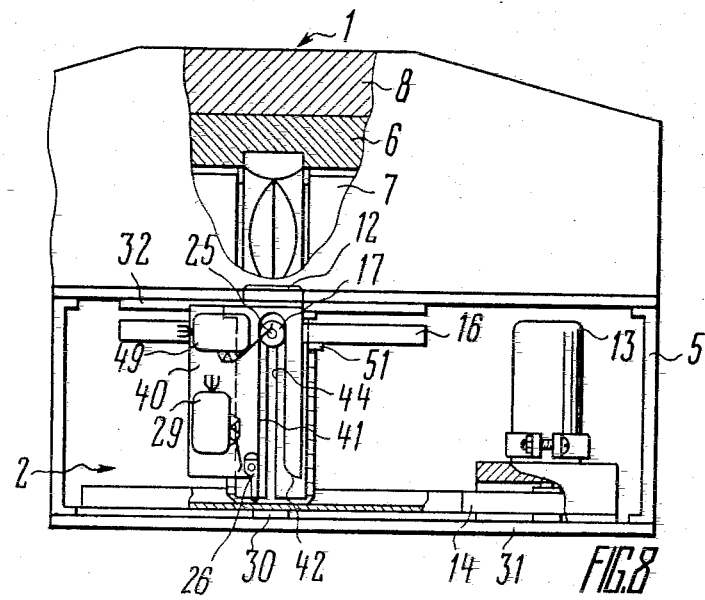
FIG. 8 is a partial sectional front view of the same counter according to the invention.
Figure 9:
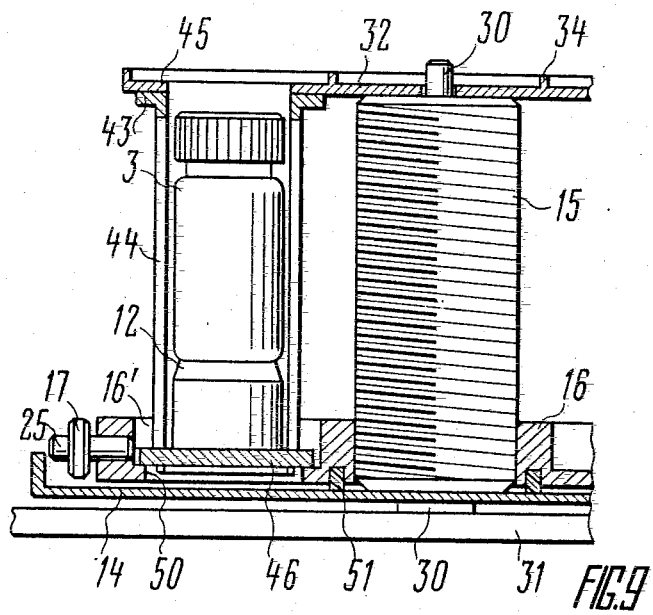
FIG. 9 is an enlarged sectional view of another embodiment of the receiving assembly comprising a cylinder according to the invention.

Besides, the receiving assembly made as a hollow cylinder 43 having two vertical slots 44 is shown in FIGS. 7, 8 and in more detail in FIG. 9. Said cylinder is fixed in a hole 45 in the disk 32 and freely passes through a hole 50 (FIGS. 3, 9) in the sliding nut 16.

The hollow cylinder 43 is designed to reliably hold the test specimen 3 by encompassing it from base to top during movement and also to make rotation of the disk 32 synchronous with the nut 16 in operation.

The microscopic stage 12 is rigidly fixed to the nut 16 by means of a strip 46 and screws 47. It moves up and down inside the hollow cylinder as if along guides. FIG. 9 shows the lowermost position of the microscopic stage 12 with the test specimen 3 located inside the cylinder 43.

The liquid scintillation counter forming the subject of the invention operates in the following manner.

The test specimen 3 is initially placed on the stage 12, say, in a section 48 of the conveyer. The hole 45 in the disk 32 is aligned with the hole 9 in the plate 4, while the rest of the disk 32 covers the hole 10 and, consequently, the hole 11 in the bottom section of the measuring chamber 6. The annular lugs of the disk 32 and the bores of the plate 4 form a lightproof labyrinth, thereby increasing reliability of light protection. Under the action of the spring 20 the bushing 19 is found in the uppermost position in the hole 9 in the plate 4, thus forming an additional lightproof shutter.

The test specimen 3 is delivered to the chamber 6 in response to a signal starting the electric motor 13 which rotates the screw 15. The nut 16 is screwed on the lead screw 15 and moves down since its butt ends mount the rollers 17 entering the slots 23 in the cylinder 22.

The stage 12 and the nut 16 are lowered. The bush 19 remaining stationary for some time encompasses the test specimen 3 forming, in conjunction with the surface of the stage 12, a sleeve holding the test specimen 3 as long as it moves.

Thus, the bush acting as an additional light shutter in its uppermost position will subsequently hold the test specimen 3 in a desired position.

The stage 12 is lowered in a precisely vertical position until the rollers 17 are found in the slots 23, that is take up position I, I', as shown in FIG. 5. As the movement proceeds, the rollers 17 get into the oblique tapered sections 24 of the cylinder 22 (position II, II') causing the nut 16 to move down and turn until the rollers 17 turn the lever 27 (position III, III') into a horizontal position and cross it, thereby taking up position IV, IV'. The other arm of the lever 27 affects the limit switch 29 which is used to reverse the electric motor 13.

The shutter 26 returns to the initial vertical position. It should be noted that, as long as the nut 16 moves, the hole 33 in the disk 32 is aligned with the microscopic stage 12 by means of the rod 39. The disk 32 turns with the nut 14. After this turn, the hole 33 in the disk 32 is aligned with the hole 10 in the plate 4 and, consequently, with the hole 11 in the chamber 6, the hole 9 in the plate 4 being closed with the disk 32. Beginning from this, the nut 16 with the test specimen 3 placed on the stage 12 moves up, the hole 33 in the disk 32, the stage 12 and the hole 10 in the plate 4 being positioned along the same axis. The rollers 17 move up in the slots 23 (positions V, V' and VI, VI') until the shaft 25 causes the limit switch 49 to change over. The test specimen will then be inside the chamber 6, and the bush 19 will be found in the hole 10 in the plate 4, thereby forming an additional light shutter.

The test specimen 3 is returned to the initial position in a similar manner, the sequence of said operations being reversed.

The counter of FIGS. 7 and 8 operates in the following manner.

The microscopic stage 12 secured to the nut 16 via the strip 46 in the hole 50 moves down. The test specimen 3 placed on the stage 12 enters the cavity of the hollow cylinder 43 which encompasses and holds it in position. As the stage 12 reaches the lowermost position (FIG. 9), the test specimen is surrounded from base to top by the cylinder 43, while the roller 17 leaves the slot 41 (FIG. 8) and the tapered section 42 of the plate 40. The nut 16 turns in the direction of rotation of the kinematic chain member 14 due to the fact that a ring 51 secured below to the nut 16 is meshed with the kinematic chain member 14. The disk 32 turns in synchronism with the microscopic stage 12 as the disk 32 cooperates with the nut 16 through its hole 50 by means of the hollow cylinder 43 rigidly affixed in the lower plane in the hole 45 in the disk 32.

Thereafter the counter of FIGS. 7 and 8 operates in a manner similar to that described above.

As distinct from the known instruments, the proposed liquid scintillation counter has substantially decreased dimensions and a smaller weight. The height and volume of the counter in compliance with the invention are decreased twice, its weight being reduced one and a half times. This permits creating a base model of a liquid scintillation counter which would make it possible to provide the following types of instruments:

(a) a simple small-size counter for individual use. It may find applications, for example, in environmental research or training practice;

(b) a desk-type instrument designed to measure a plurality of test specimens for many users;

(c) a small-size, highly efficient and economic measuring system comprising a set of said base instruments and a conventional assortment of facililties relating to data processing and control of joint operation of all counters within the system, complete with a common enclosure, a cooling unit and other servicing means.

Furthermore, such a system will be characterized by that its capacity may be suitably changed depending on a particular application by successively filling it with requisite base instruments and other facilities, a feature enabling its more efficient and versatile utilization.

Thus, the proposed liquid scintillation counter is a versatile base instrument for creating a new generation of economic liquid scintillation counters, systems and complexes associated therewith.

What is claimed is:

1. A liquid scintillation counter, comprising: a detector having a measuring chamber, a hole in the bottom portion of said measuring chamber for delivering thereto a test specimen, and photomultiplier tubes;
   a protective shell encompassing said detector;
   means for delivering a test specimen to said measuring chamber, said means moving the test specimen substantially downwardly, then towards said detector and substantially upwardly into said measuring chamber wherefrom said test specimen is moved back in reverse order; said means for delivering having a receiving assembly for mounting the test specimen;
   a horizontal plate having a first and a second hole; said first hole accommodating said receiving assembly;
   said detector being positioned over said second hole so that said hole in the bottom portion of said measuring chamber is aligned with said second hole in said plate;

said means for delivering the test specimen having power means;

a screw assembly having a lead screw rotated by said power means and positioned stationary relative to said horizontal plate, substantially parallel to the longitudinal axis of said counter and symmetrically relative to geometrical axes of said first and second holes in said plate, said screw assembly having a nut for mounting of said receiving assembly, said nut being screwed on said lead screw for movement along thereof, during movement of the test specimen, said nut being turned around said lead screw while the test specimen is turned towards said detector and back from it;

guide means enabling progressive movement of said nut;

at least one slot provided in said guide means;

at least one roller secured on butt end of said nut and cooperating with said slot to prevent turning of said nut relative to said lead screw;

a shutter postioned at an outlet of said slot of said guide means and cooperating with said roller to convert the turning movement of said nut into a translational upward movement;

said nut comprising means for causing said receiving assembly to move so that it being positioned precisely within said first or second hole in said plate as said nut being turned and lifted.

2. A liquid scintillation counter as claimed in claim 1, wherein said measuring chamber is installed directly on said plate so that said hole in its bottom portion is a continuation of said second hole in said plate.

3. A liquid scintillation counter according to claim 1, in which said guide means are made as a hollow cylinder positioned in line with said lead screw, while said screw assembly is arranged inside the hollow cylinder.

4. A liquid scintillation counter as claimed in claim 1, wherein said guide means are made as a vertical plate.

5. A liquid scintillation counter as claimed in claim 1, comprising a light shutter to preclude penetration of light into said measuring chamber, said light shutter representing a rotary disk arranged below said plate and above said means for delivering said test specimen; said rotary disk having one hole in a section whose axis is a continuation of the geometrical axis of said receiving assembly; its hole being also aligned with said first or second hole in said plate depending on the position of said disk.

6. A liquid scintillation counter as claimed in claim 5, wherein, with means for making said disk rotate in synchronism with said nut, said means comprising a hole in said nut and a rod secured to said disk, said rod passing freely through said hole in said nut and having a length comparable with a vertical stroke of said nut.

7. A liquid scintillation counter as claimed in claim 5, wherein lugs are provided on said rotary disk and bores are found on the surface of said plate facing said rotary disk, a lightproof labyrinth being formed by said bores in conjunction with said lugs.

8. A liquid scintillation counter according to claim 1, in which said receiving assembly comprises a microscopic state, a bush movable with respect to said microscopic stage and encompassing it, and a spring loading said bush.

9. A liquid scintillation counter as claimed in claim 8, wherein said nut has a second hole aligned with said first hole in said plate; said microscopic stage being secured to said nut; said receiving assembly comprising a hollow cylinder fixed in said hole in said disk and freely passing through said second hole in said nut; vertical slots being provided in said hollow cylinder, said microscopic stage moving within said vertical slots inside said hollow cylinder as said nut moves; said hollow cylinder comprising means to hold said test specimen during movement and serving to synchronize rotation of said nut and said rotary disk.

10. A liquid scintillation counter according to claim 1 wherein said power means is an electrical motor.

* * * * *